(12) United States Patent
Valles et al.

(10) Patent No.: US 11,118,996 B2
(45) Date of Patent: *Sep. 14, 2021

(54) OIL FILTER-LEAK PRESSURE-TEST STATION

(71) Applicant: K&N Engineering, Inc., Riverside, CA (US)

(72) Inventors: Joel Valles, Simi Valley, CA (US); Steve Williams, Cherry Valley, CA (US); Jonathan Richard Fiello, Yucaipa, CA (US)

(73) Assignee: K&N Engineering, Inc., Riverside, CA (US)

(*) Notice: Subject to any disclaimer, the term of this patent is extended or adjusted under 35 U.S.C. 154(b) by 166 days.

This patent is subject to a terminal disclaimer.

(21) Appl. No.: 16/247,824

(22) Filed: Jan. 15, 2019

(65) Prior Publication Data

US 2019/0145846 A1 May 16, 2019

Related U.S. Application Data

(63) Continuation of application No. 15/484,003, filed on Apr. 10, 2017, now Pat. No. 10,203,260.

(60) Provisional application No. 62/325,384, filed on Apr. 20, 2016.

(51) Int. Cl.
| | |
|---|---|
| *G01M 15/09* | (2006.01) |
| *G01M 3/02* | (2006.01) |
| *F01M 1/20* | (2006.01) |
| *G01M 3/26* | (2006.01) |
| *F01M 11/03* | (2006.01) |

(52) U.S. Cl.
CPC .............. *G01M 3/025* (2013.01); *F01M 1/20* (2013.01); *G01M 3/26* (2013.01); *G01M 15/09* (2013.01); *F01M 11/03* (2013.01)

(58) Field of Classification Search
CPC ........ F01M 1/20; G01M 3/025; G01M 15/02; G01M 15/09
See application file for complete search history.

(56) References Cited

U.S. PATENT DOCUMENTS

| | | | |
|---|---|---|---|
| 2,933,604 | A | 4/1960 | Norton |
| 3,400,580 | A | 9/1968 | Haren |
| 4,125,014 | A | 11/1978 | Candea |
| 4,448,063 | A | 5/1984 | Mudge et al. |
| 4,967,776 | A | 11/1990 | Folmar |
| 5,340,471 | A | 8/1994 | Wilson et al. |
| 5,515,712 | A | 5/1996 | Yunick |

(Continued)

*Primary Examiner* — Eric S. McCall
(74) *Attorney, Agent, or Firm* — Rutan & Tucker LLP; Hani Z. Sayed

(57) ABSTRACT

An apparatus and a method are provided for an oil filter-leak pressure-test station. The oil filter-leak pressure-test station comprises an air pump, a pressure gauge, a vent valve, an overflow reservoir, and a manifold configured to receive an oil filter. The oil filter-leak pressure-test station is configured to apply a desired internal air pressure to an oil filter for observing the oil filter assembly for any potential leaks, such as along a seal ring, rolled seam or a nut-end. The oil filter-leak pressure-test station is also configured to be mounted in a vise or similar mechanical attachment for observation to determine the extent or existence of any leak in the oil filter. The oil filter-leak pressure-test station may also be submerged in water using a submersion reservoir, so as to determine the existence and location of any leaks.

10 Claims, 9 Drawing Sheets

(56) References Cited

U.S. PATENT DOCUMENTS

| | | |
|---|---|---|
| 5,651,307 A | 7/1997 | Reny |
| 5,987,975 A | 11/1999 | Rafei |
| 6,038,918 A | 3/2000 | Newton |
| 6,267,094 B1 | 7/2001 | Kuettner et al. |
| 6,334,950 B1 | 1/2002 | Bogacki et al. |
| 7,524,416 B1 | 4/2009 | Bergmen |
| 2005/0133065 A1 | 6/2005 | Kincaid et al. |
| 2005/0211024 A1 | 9/2005 | Shpakow |
| 2012/0318753 A1 | 12/2012 | Forrester |
| 2015/0001143 A1 | 1/2015 | Bell |
| 2016/0326923 A1 | 11/2016 | Raby et al. |

OIL FILTER-LEAK PRESSURE-TEST STATION

CROSS-REFERENCE

This application is a continuation of and claims benefit to U.S. patent application Ser. No. 15/484,003, filed Apr. 10, 2017, which claims the benefit of U.S. Provisional Patent Application No. 62/325,384, filed Apr. 20, 2016, both entitled "Oil Filter Leak Pressure Test Station," and which applications are incorporated herein by reference in their entirety.

FIELD

The field of the present disclosure generally relates to oil filters. More particularly, the field of the invention relates to an apparatus and a method for observing undesirable leaks with respect to an oil filter apparatus.

BACKGROUND

An internal combustion engine comprises a plurality of moving metal components so as to generate rotational motive force as commonly used in motor vehicles. In an absence of lubrication, the metal components would rub against one another, causing overheating and damage due to friction. A well-known method for reducing friction within the engine is to coat the metal components with a suitable lubricant, such as engine oil.

In general, a cleaner motor oil better lubricates an engine of a motor vehicle. As will be appreciated, however, while the motor oil lubricates the engine, abrasion between the components within the engine may occur. As a result, very fine metal particles are introduced slowly into the motor oil. These metal particles cause further friction, and thus cause harm to the engine in the long term. Furthermore, heat and air cause the motor oil to break down into simpler compounds, as well as polymerize into more complex compounds. As those skilled in the art will appreciate, compounds due to oil break-down do not lubricate an engine as effectively as fresh motor oil. Therefore, maintaining oil is of critical importance as it extends the life of the engine.

An oil filter may be used to remove contaminants due to oil break-down and polymerization of the engine oil. The oil filter operates to entrap metal and contaminants that are suspended in the motor oil having been circulated through the engine. However, the effectiveness of the oil filter is contingent upon there being no leaks in the oil filter, or its overall assembly. For example, if a leak exists or develops in the oil filter and/or its assembly, then harmful contaminants and/or oil may leak past elements that are configured to prevent any leakage, thereby resulting in an oil leak that could starve the engine of desirable lubrication.

What is needed, therefore, is an oil filter-leak pressure-test station that provides a mechanism whereby oil filter assemblies may be tested to ensure that no leaks exist.

BRIEF DESCRIPTION OF THE DRAWINGS

The drawings refer to embodiments of the present disclosure in which.

Figure 1:
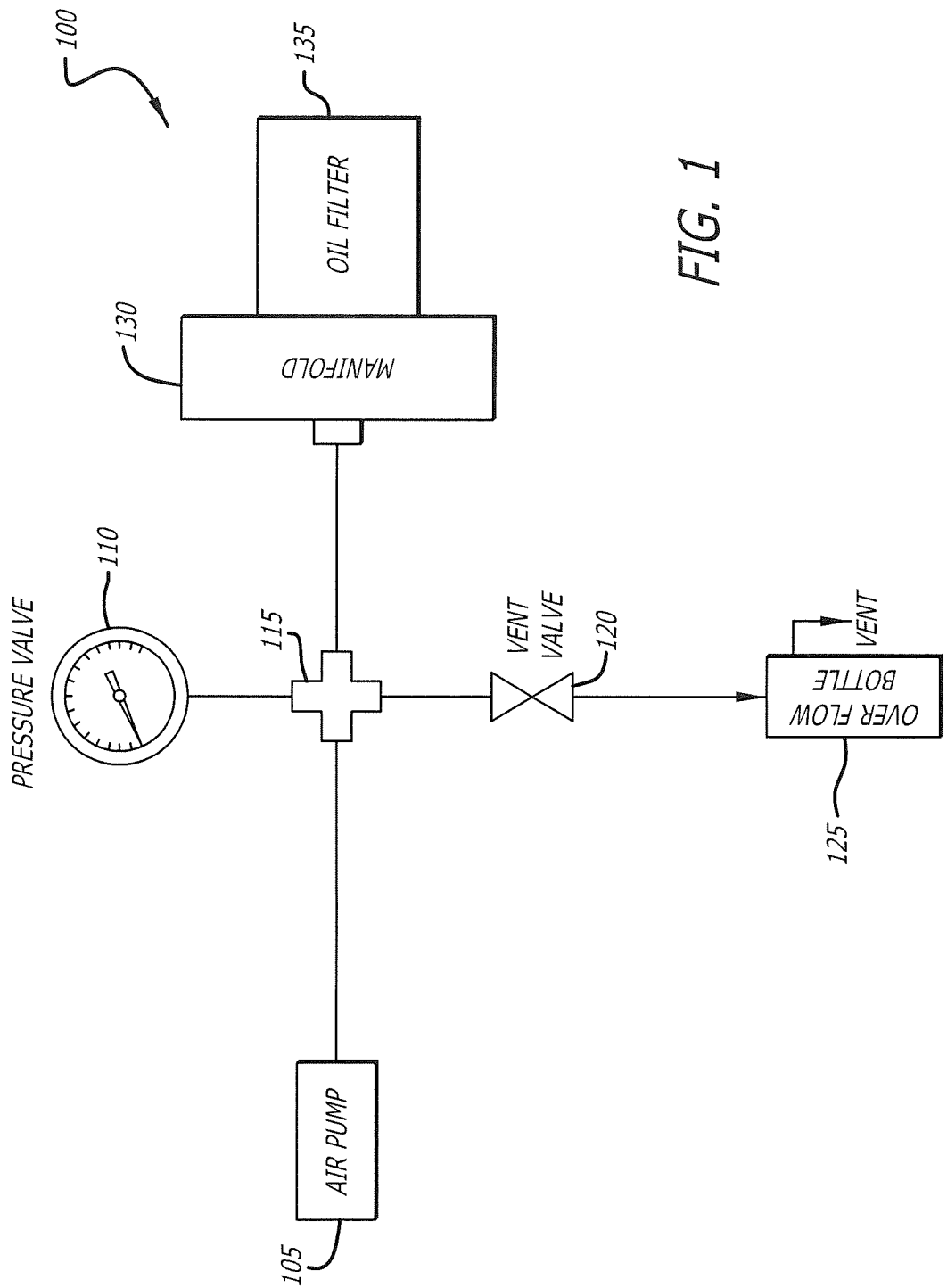
FIG. 1 is a schematic diagram illustrating an exemplary oil filter-leak pressure-test station.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first conduit," may be made. However, the specific numeric reference should not be interpreted as a literal sequential order but rather interpreted that the "first conduit" is different than a "second conduit." Thus, the specific details set forth are merely exemplary. The specific details may be varied from and still be contemplated to be within the spirit and scope of the present disclosure. The term "coupled" is defined as meaning connected either directly to the component or indirectly to the component through another component. The term "exemplary" is an adjective used to indicate a following noun is merely an example, not necessarily a preferred example. For example, an exemplary oil filter-leak pressure-test station is an example of an oil filter-leak pressure-test station. Further, as used herein, the terms "about," "approximately," or "substantially" for any numerical values or ranges indicate a suitable dimensional tolerance that allows the part or collection of components to function for its intended purpose as described herein.

In general, the present disclosure describes an apparatus and a method for an oil filter-leak pressure-test station. An apparatus such as an oil filter-leak pressure-test station will be described first, and a method corresponding to the apparatus will be described second. However, it should be understood that the foregoing is a convention, as elements of the apparatus are also provided in the description of the method, and steps of the method are also provided in the description of the apparatus.

Regarding the apparatus, in one embodiment the apparatus is an oil filter-leak pressure-test station comprising an air pump, a pressure gauge, a vent valve, an overflow reservoir, and a manifold configured to receive an oil filter. Preferably, the oil filter-leak pressure-test station is configured to apply a desired air pressure to an oil filter and thereby demonstration a presence of any potential leaks within the oil filter assembly, for example along a seal ring, rolled seam, nut end, or any other portion of the oil filter that may have been formed by way of a welding procedure. The oil filter-leak pressure-test station is also configured to be mounted in a vise or similar mechanical attachment for observation to determine an extent or existence of any leak in the oil filter. The oil filter-leak pressure-test station may also be submerged in water, using a submersion reservoir, so as to further determine the existence and location of any leaks.

In one embodiment, the oil filter-leak pressure-test station may be configured to determine a point at which the oil filter will fail as a result of pressure, and it may also be defined as a point right before failure will occur. In either case, this pressure could be considered at least a factor with respect to the maximum pressure the oil filter may endure before it reaches a breaking point. Those skilled in the art will appreciate that it is important to consider this pressure when designing any oil filter. However, the principles discussed herein are equally applicable to any pressurized working fluid, including, by way of non-limiting example, any one or more working fluids selected from oil, water, gas, and various other suitable fluids, independent of whether the fluid is utilized in conjunction with an automobile.

FIG. 1 is a schematic diagram illustrating an exemplary oil filter-leak pressure-test station 100, according to the present disclosure. In its most general form, the oil filter-leak pressure-test station 100 comprises an air pump 105, a pressure gauge 110 (or pressure valve 110), an interface fitting 115, a vent valve 120, an overflow reservoir 125 (or overflow bottle 125), and a manifold 130 configured to receive an oil filter 135. The interface fitting 115 generally is configured to establish fluid communication among the air pump 105, the pressure gauge 110, the vent valve 120, the overflow bottle 125, and the manifold 130 as shown. The air pump 105 preferably is configured to modulate an internal pressure within the oil filter 135 to demonstrate the existence or extent of any potential leaks.

Using pressure data, the oil filter 135 may be optimized depending on the end-use application. By measuring the pressure, one can measure a maximum pressure or a burst pressure so as to determine optimal components, measurements, qualities and specific materials that may be used to construct he oil filter 135. For example, the canister, gaskets and/or interfaces used with the oil filter 135 may be adapted to withstand a desired pressure. It should be appreciated that the quality of the material comprising the oil filter 135, and its thickness, may determine how much pressure the oil filter may withstand. However, from a design perspective, the environment must also be considered. For example, in applications where the oil filter 135 is used in a high temperature environment, the material comprising the oil filter may be weakened by the heat, thereby significantly lowering the burst pressure of the oil filter. Similarly, extreme cold conditions may also be a factor in determining the burst pressure of the oil filter 135.

In one embodiment, the oil filter 135 is fluidly coupled to the manifold 130 using any of various methods and/or attachments. The air pump 105 is then utilized to increase the pressure within the oil filter 135, which may be monitored using the pressure gauge 110. It is envisioned that during the oil filter analysis, the pressure may be gradually increased to demonstrate a pressure at which the oil filter 135 will burst, and more specifically, when and if any leaks are created. By taking the pressure into account, one can determine whether or not the oil filter 135 is appropriate for an intended use or environment. It should be appreciated that the oil filter 135 should be designed so as to exceed the potential pressure of an intended system so that in the event of a pressure spike, the oil filter 135 will not fail in its end use environment.

Figure 2:
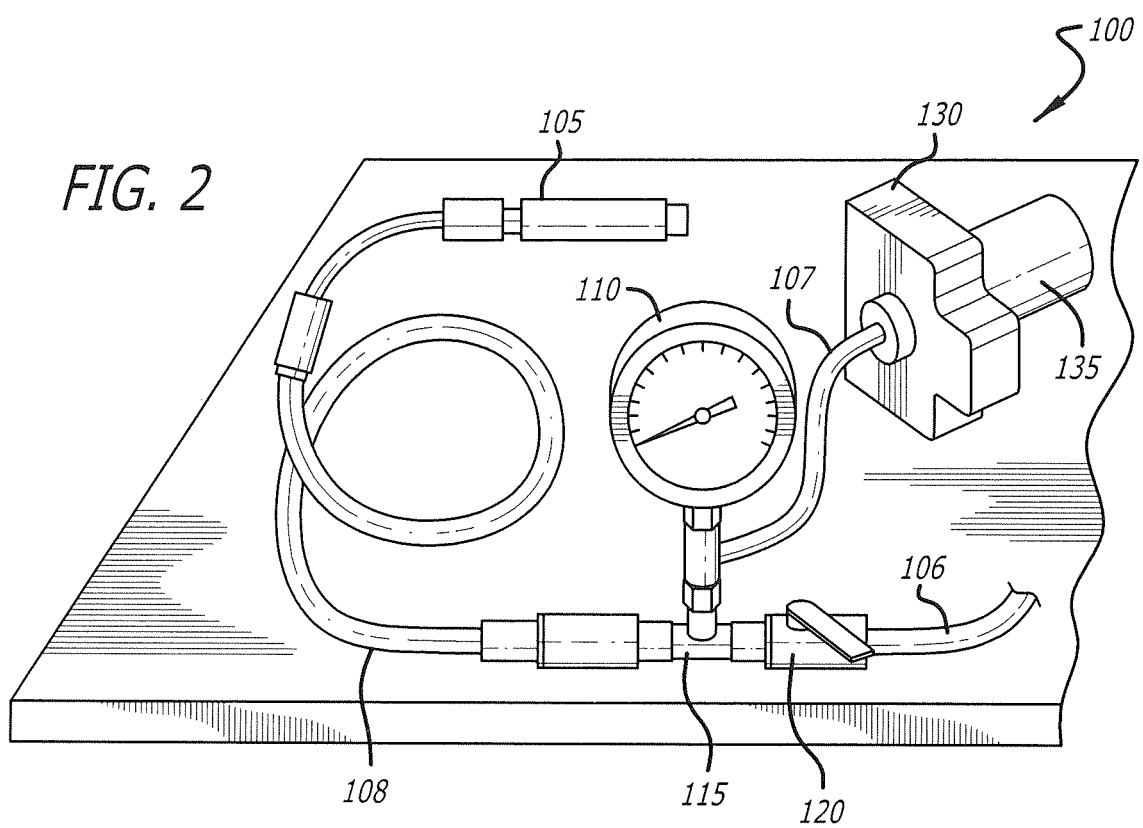
FIG. 2 is a perspective view illustrating an exemplary oil filter-leak pressure-test station.

FIG. 2 is a perspective view illustrating the exemplary oil filter-leak pressure-test station 100, according to the present disclosure. As shown, the air pump 105 is in fluid communication with the oil filter 135 by way of the interface fitting 115 and the manifold 130. The air pump 105 may be analog, or powered, for example via an electric drive. Similarly, the pressure gauge 110 may be provided for in an analog or digital form, depending on a practitioner's preference.

In one embodiment, the interface fitting 115 is configured to couple with a plurality of components, including the pressure gauge 110 and any of various conduits such as conduits 106, 107, and 108, without limitation. It is envisioned that the interface fitting 115 may be a brass and/or copper fitting that is desirably non-corrosive in nature; however, a variety of other materials may be utilized for the interface fitting 115, without limitation, including, for example, any one or more materials selected from PVC, plastic, polyurethane, and the like. The interface fitting 115 may be configured so as to be fluidly coupled with any number of measurement elements, via conduit 107. In one embodiment, the interface fitting 115 comprises a 4-way connector that may receive conduits in addition to those shown in FIG. 2. In one embodiment, the conduit 107 comprises a silicone hose, although any other material may be used without limitation. For example, the conduit 107 may comprise any of various coatings, such as polytetrafluoroethylene or the like, so as to repel corrosion from abrasive liquids and/or fumes.

Figure 3:
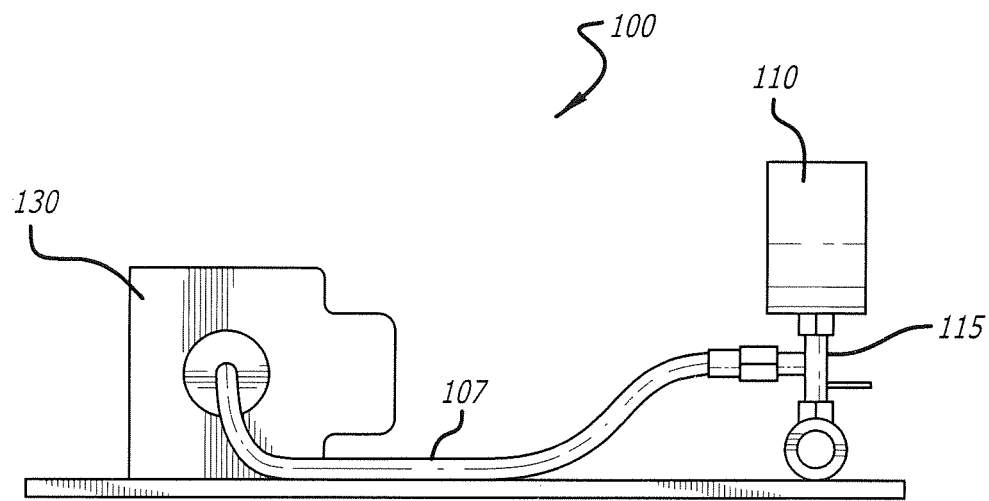
FIG. 3 is a side plan view illustrating an exemplary oil filter-leak pressure-test station.

FIG. 3 is a side plan view illustrating the exemplary oil filter-leak pressure-test station 100, according to the present disclosure. As shown, the conduit 107 fluidly couples the manifold 130 to the pressure gauge 110 via the interface fitting 115. Thus, the pressure gauge 110 is advantageously positioned within the oil filter-leak pressure-test station 100 to display the pressure being exerted on the oil filter 135 by way of the conduit 107. It is contemplated that the pressure gauge 110 may be digital or analog, and may display pressure measurements in terms of any suitable system of units, including, by way of non-limiting example, PSI, SI, or metric units.

Figure 4:
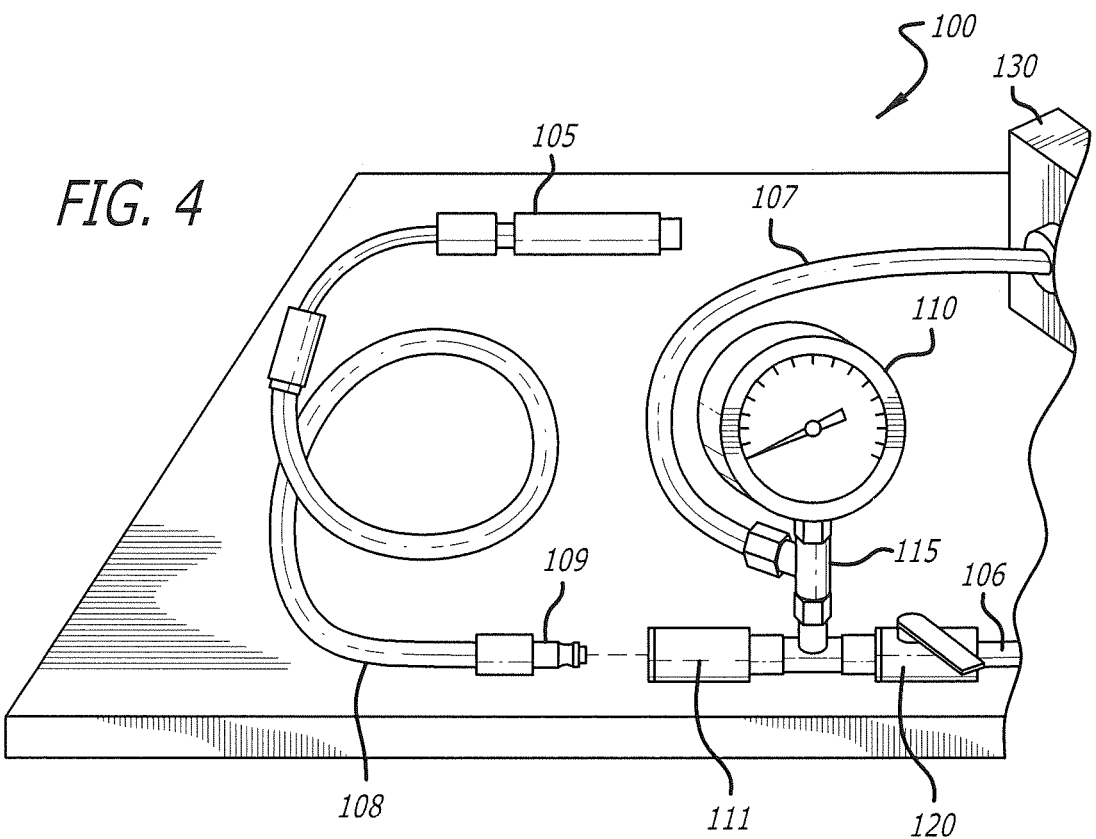
FIG. 4 is a perspective view illustrating an exemplary fitting as used in one embodiment in conjunction with an oil filter-leak pressure-test station.

FIG. 4 is a perspective view illustrating exemplary fittings 109, 111 that may be used in one embodiment in conjunction with the oil filter-leak pressure-test station 100, according to the present disclosure. In one embodiment, the fittings 109, 111 may comprise any number of styles and types, without limitations. Preferably, the fittings 109, 111 may comprise quick-disconnect-type fittings, including, by way of non-limiting example, a quick-disconnect-type fitting selected from hydraulic quick couplings, pneumatic connectors and couplers, test port couplers, and the like. As shown by way of example, in FIG. 4, the oil filter-leak pressure-test station 100 includes a pneumatic connector 109 and a pneumatic coupler 111. The fittings 109, 111 are desirably used to connect and/or disconnect hydraulic or pneumatic conduits quickly and easily without the use of tools.

The vent valve 120 may comprise one or more block/isolate valves, usually ball valves, and one or more bleed/vent valves, usually ball or needle valves, into one component, for interface with other components (e.g., the air pump 105, the pressure gauge 110, the interface fitting 115, the overflow reservoir 125, and the manifold 130) of the oil filter-leak pressure-test station 100. In some embodiments, the vent valve 120 enables a practitioner to manually vent air through the conduit 106 so as to control the pressure within the oil filter-leak pressure-test station 100. Further, one purpose of the vent valve 120 is to enable the practitioner to vent air and reduce pressure in the oil filter-leak pressure-test station 100 subsequent to an oil filter-leak pressure test. Another purpose of the vent valve 120 may be to isolate or block the flow of a working fluid in the oil filter-leak pressure-test station 100, so the working fluid from upstream of the vent valve 120 does not reach other components of the oil filter-leak pressure-test station 100 that are downstream, then bleed off or vent the remaining fluid from the oil filter-leak pressure-test station 100 on the downstream side of the vent valve 120. For example, the vent valve 120 may be used to stop the flow of working fluids to some component, then vent the fluid from that component's side of the manifold, in order to enable some kind of work (maintenance/repair/replacement) on that component. As such, the vent valve 120 may also be configured as an isolation valve.

Figures 5, 6:
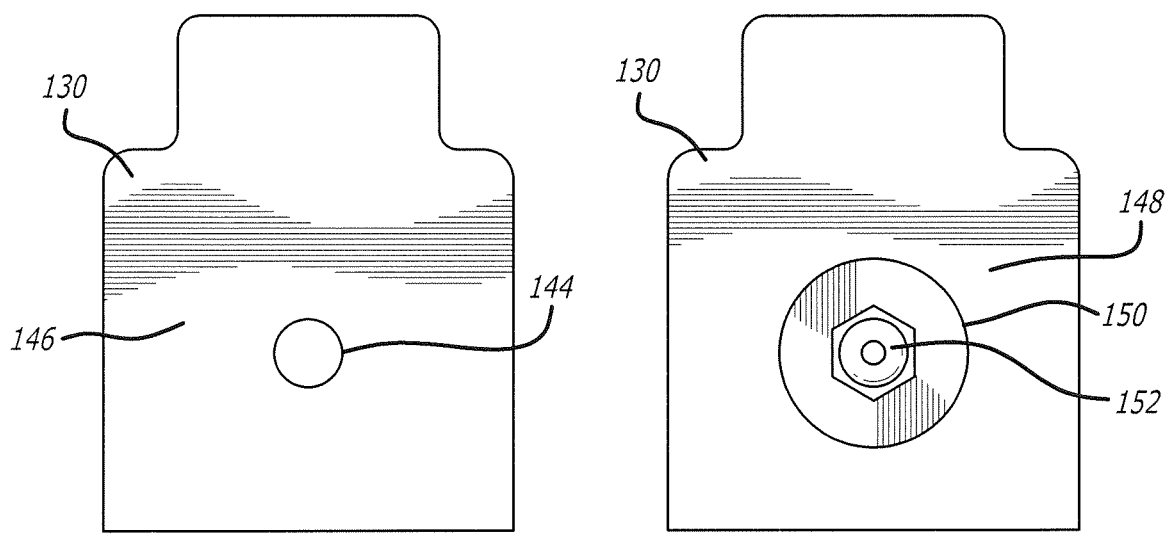
FIG. 5 is a front plan view illustrating an exemplary manifold as used in one embodiment in conjunction with an oil filter-leak pressure-test station.
FIG. 6 is a rear plan view illustrating the exemplary manifold of FIG. 5, as used in one embodiment in conjunction with an oil filter-leak pressure-test station.

FIG. 5 is a front plan view illustrating an exemplary manifold 130 as used in one embodiment in conjunction with the oil filter-leak pressure-test station 100, according to the present disclosure. In one embodiment, the manifold 130 may be machined from solid aluminum, or any other suitable metal. It is envisioned that various other materials may also be utilized, such as any of various plastics, polyurethane, rubber, or any combinations thereof. In one embodiment, the manifold 130 comprises an engagement point 144 disposed at a center of an oil filter-facing surface 146 of the manifold 130 and configured to receive an oil filter adaptor 160, discussed herein with respect to FIG. 12. The oil filter adapter 160 generally is configured to couple the oil filter 135 with the manifold 130, and thus the air pump 105 by way of the conduit 107, for pressure testing purposes, as described herein. As further described with reference to FIG. 10, the oil filter adapter 160 may include any diameter, thread size and pitch, as well as any of various grooves, ridges, or other fastening means for the purpose of coupling any of a plurality of types and styles of the oil filter 135 with the manifold 130, without limitation.

FIG. 6 is a rear plan view illustrating the exemplary manifold 130 as used in one embodiment in conjunction with the oil filter-leak pressure-test station 100, according to the present disclosure. As shown in FIG. 6, the manifold 130 comprises a quick-release attachment 150 including a nozzle 152 that are disposed on a pressure gauge-facing surface 148 and are in fluid communication with the engagement point 144 on the oil filter-facing surface 146. The quick-release attachment 150 and the nozzle 152 enable a practitioner to safely and quickly release any of various conduits, such as, for example, the conduit 107. In one embodiment, the quick-release attachment 150 is configured for high resistance to pressure, so as to provide optimal flow capabilities. In one embodiment, the quick-release attachment 150 may comprise materials that differ from the manifold 130; however, it is envisioned that the quick-release attachment 150 may also be formed from the same material as the manifold 130 in some embodiments. In some embodiments, the quick-release attachment 150 may be formed using any of various machine tools, including one or more machine tools selected from CNC-automated machine tools, drills, and saws, or formed using any of various other methods known to those having skill in the art.

Figure 7:
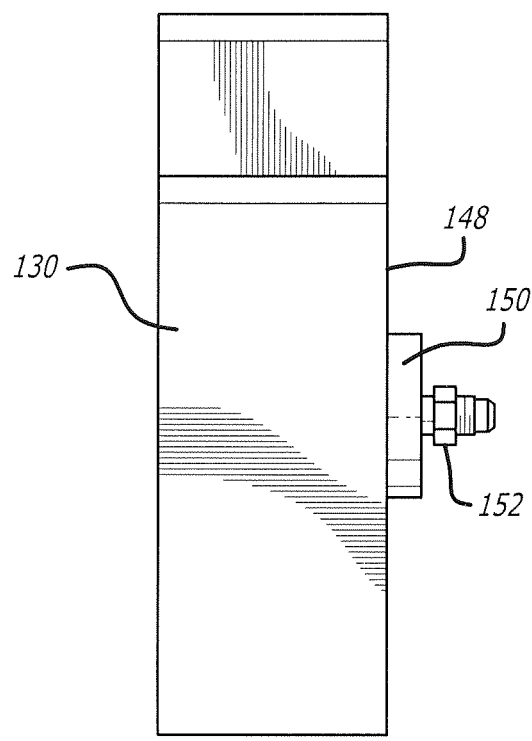
FIG. 7 is a top plan view illustrating the exemplary manifold of FIG. 5, as used in one embodiment in conjunction with an oil filter-leak pressure-test station.

FIG. 7 is a top plan view illustrating the exemplary manifold 130 as used in one embodiment in conjunction with the oil filter-leak pressure-test station 100, according to the present disclosure. As shown, the quick-release attachment 150 comprises the nozzle 152. It should be understood that the nozzle 152 is formed so as to be adaptable with a plurality of working fluids, including liquids and gases, with modular construction allowing for a wide range of options, such as, for example, safety key coding, various seal compounds and coupling materials, and the like, without limitation.

Figure 8:
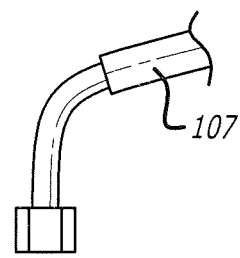
FIG. 8 is a top plan view illustrating the exemplary manifold of FIG. 5 receiving a conduit in conjunction with one embodiment of an oil filter-leak pressure-test station.
Figure 8:
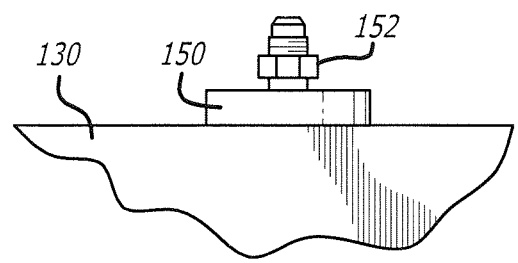

FIG. 8 is a top perspective view illustrating the exemplary manifold 130 in one embodiment in conjunction with the oil filter-leak pressure-test station 100, according to the present disclosure. As shown, the conduit 107 is configured to be coupled with the nozzle 152. In one embodiment, the nozzle 152 comprises a male fitting that includes exterior threads that are configured to threadably engage with interior threads disposed in a female fitting coupled with the conduit 107. In one embodiment, the conduit 107 may be adapted with a spring-loaded, quick-release mechanism that is configured to couple the conduit 107 together with the nozzle 152 when they are pushed together. When a releasing sleeve of the conduit 107 is pulled back, the conduit 107 and the nozzle 152 quickly disengage from one other. It should be understood that the quick-release feature is advantageous in designs that require numerous connections throughout the life cycle of various fittings and product types.

Figure 9:
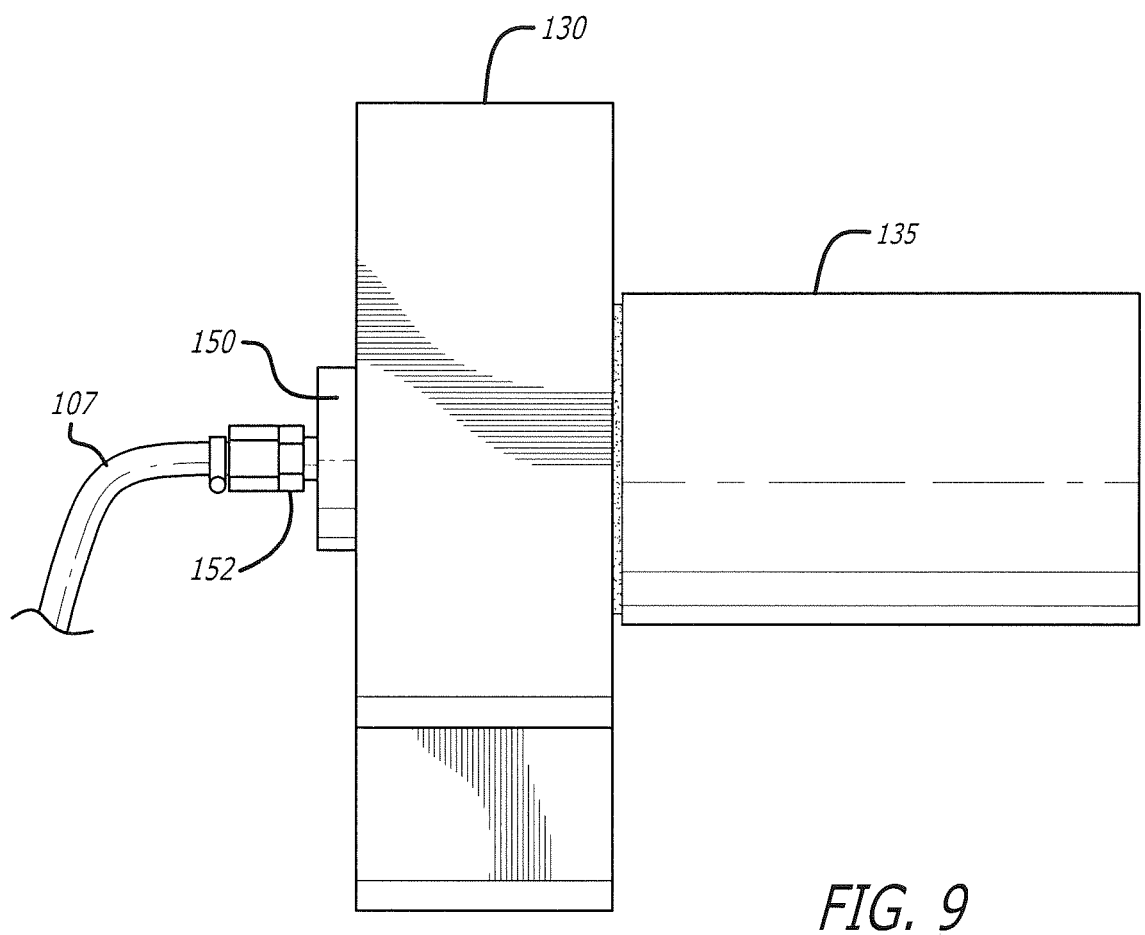
FIG. 9 is a top plan view illustrating an exemplary configuration wherein an oil filter is coupled with a conduit by way of a manifold.

FIG. 9 is a top plan view illustrating an exemplary configuration wherein the oil filter 135 is coupled with the conduit 107 by way of the manifold 130. As discussed with respect to FIGS. 5-8, the oil filter 135 may be coupled with the manifold 130 by way of the oil filter adapter 160, and the conduit 107 may be coupled with the manifold by way of the quick-release attachment 150 and the nozzle 152. Thus, in the configuration shown in FIG. 9, the oil filter 135 is placed into fluid communication with the air pump 105 by way of the conduit 107 and the engagement point 144 extending through the manifold 130. The practitioner may pressure-test the oil filter 135 by using any of various working fluids and experimental techniques, as discussed herein.

Figure 10:
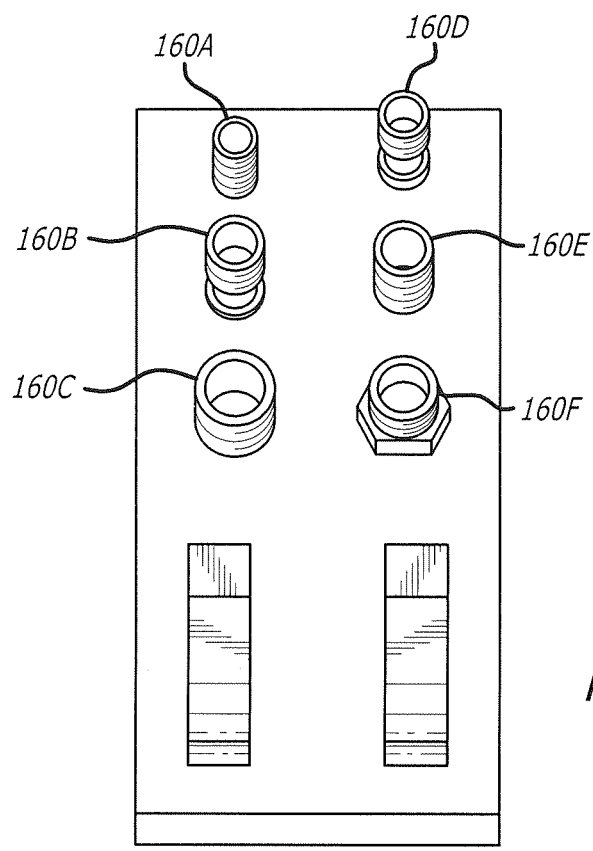
FIG. 10 is a perspective view illustrating an exemplary embodiment of a plurality of oil filter adapters that may be used to couple an oil filer with a manifold.

FIG. 10 is a perspective view illustrating an exemplary embodiment of a plurality of oil filter adapters 160A-160F, according the present disclosure. It is envisioned that embodiments of the disclosure will be useful for testing a plurality of types and styles of the oil filter 135, which may, of course, vary based on the make and model of the oil filter application (e.g., car, truck, heavy machinery, etc.). Consequently, as shown in FIG. 10, the plurality of oil filter adapters 160A-160F are shown with different configurations, including, for example, various ridges and/or grooves.

It is envisioned that a small diameter adapter 160A, a medium diameter adapter 160E, or a large diameter adapter 160C may be used, depending on the application. Furthermore, it is envisioned that an extended or elevated adapter, such as elevated adapter 160B or elevated adapter 160D may be used, depending on the application. Moreover, it is envisioned that a nut-type adapter 160F may be used, depending on the application. It is envisioned that a plurality of types and styles of the oil filter 135 may be tested by coupling any of the adapters 160A-160F with a single manifold 130 having a single engagement point 144.

Figure 11:
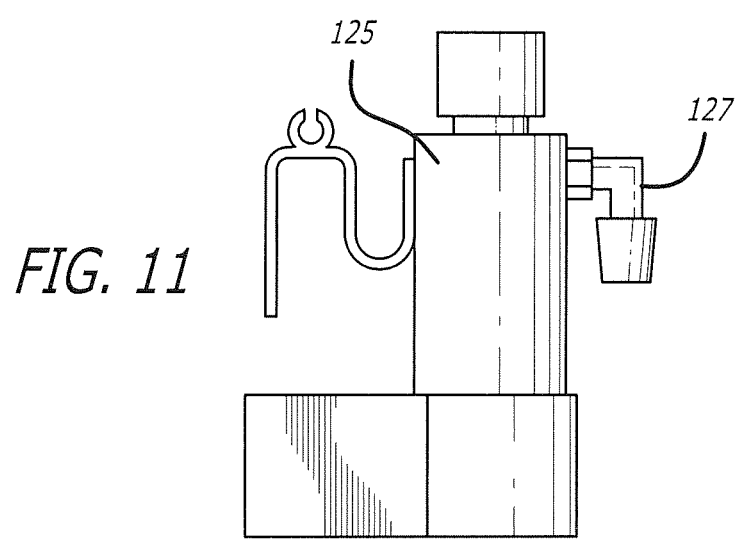
FIG. 11 is a side plan view of an exemplary embodiment of an overflow reservoir.

FIG. 11 is a side plan view of an exemplary embodiment of an overflow reservoir 125. In the illustrated embodiment, the overflow reservoir 125 is comprised of a fitting 127 that is configured to be coupled with the conduit 106 so as to receive an airstream from the oil filter-leak pressure-test station 100 that escapes through the vent valve 120. The overflow reservoir 125 is configured to capture any oil mist and condense any vapors that may be flowing with the airstream, allowing relatively cleaner air to escape into the atmosphere. In some embodiments, the oil mist and vapors may be passed through a wire mesh, which encourages condensation of the vapor and allows droplets to fall to a bottom portion of the overflow reservoir 125. It should be understood, therefore, that the overflow reservoir 125 will need to be periodically emptied or drained of collected oil, fluids, and any other of various contaminants.

Figure 12:
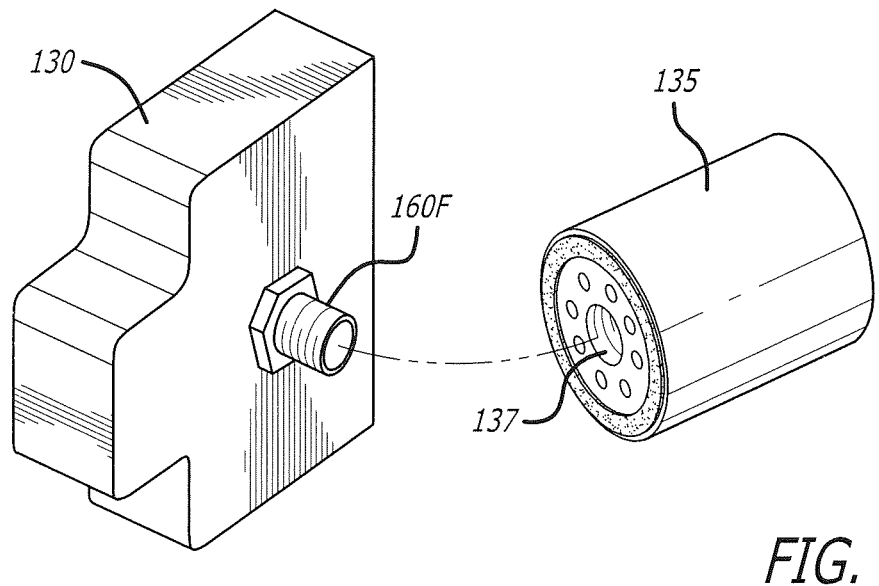
FIG. 12 is a perspective view of an exemplary use environment wherein an oil filter adapter fluidly couples an oil filter with the manifold of FIG. 2.

FIG. 12 is a perspective view of an exemplary use environment wherein the oil filter adapter 160F fluidly couples the oil filter 135 with the manifold 130, in accordance with the present disclosure. As will be recognized, the oil filter adapter 160F is selected from among the plurality of oil filter adapters 160A-160F, shown in FIG. 10, so as to be received into a female opening 137 of the oil filter 135. It should be understood that the physical properties of the female opening 137, such as diameter, thread size, thread pitch, and the like, will determine which adapter among the plurality of oil filter adapters 160A-160F may be selected for coupling the oil filter 135 with the manifold 130. As disclosed above, the plurality of oil filter adapters 160A-160F facilitate coupling a variety of different types and styles of the oil filter 135 with the manifold 130.

Figure 13:
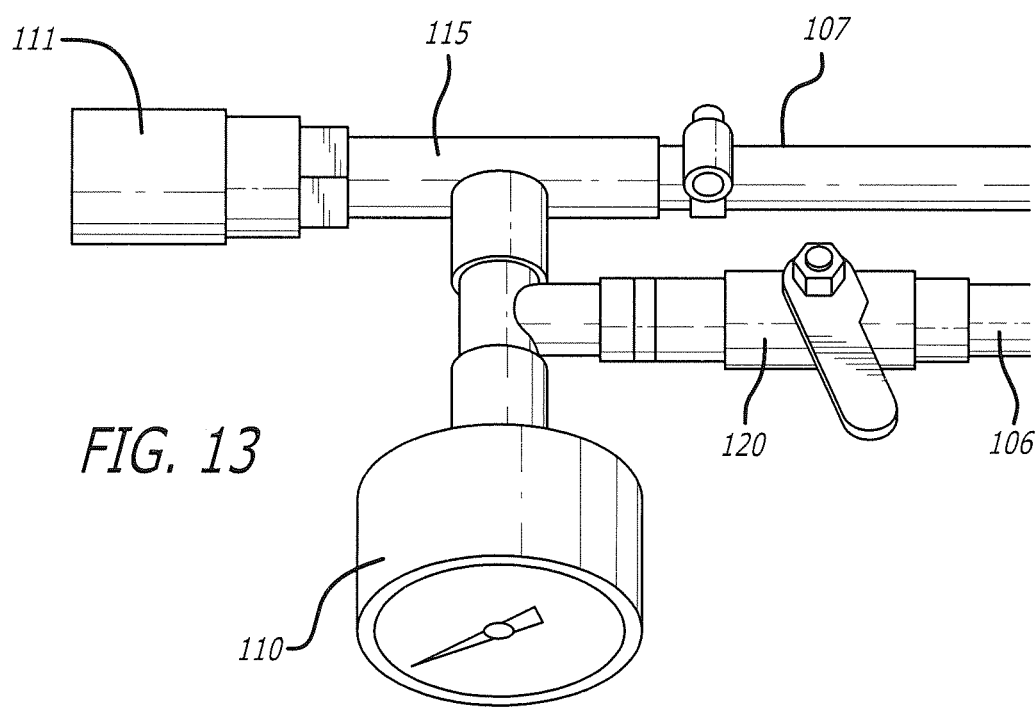
FIG. 13 is a perspective view illustrating an exemplary embodiment of connections between conduits, a pressure gauge, and a vent valve comprising the oil filter-leak pressure-test station of FIG. 2.

FIG. 13 is a perspective view illustrating an exemplary embodiment of the connections between the conduits 106, 107, the interface fitting 115, the pressure gauge 110, and the vent valve 120. As mentioned hereinabove, the vent valve 120 enables a practitioner to manually control the pressure within the oil filter-leak pressure-test station 100 by venting air from the conduit 107 to the conduit 106. To this end, it is contemplated that the practitioner may partially open the vent valve 120 while observing the pressure within the oil filter-leak pressure-test station 100 by way of the pressure gauge 110. The pressure gauge 110 may be digital or analog, and may include readings expressed in terms of any of various suitable measurement units, including, by way of non-limiting example, PSI, SI units, other metric units, and the like. Further, it is contemplated that fully opening the vent valve 120 advantageously enables the practitioner to relieve the pressure within the oil filter-leak pressure-test station 100 following completion of an oil filter-leak pressure test. As will be appreciated, in some embodiments, the vent valve 120 and the connections illustrated in FIG. 13 may operate as a bleed valve for safety purposes. As such, the bleed valve may be configured to vent a predetermined amount of airflow so as to prevent a rupture of any of the components comprising the oil filter-leak pressure-test station 100.

Figure 14:
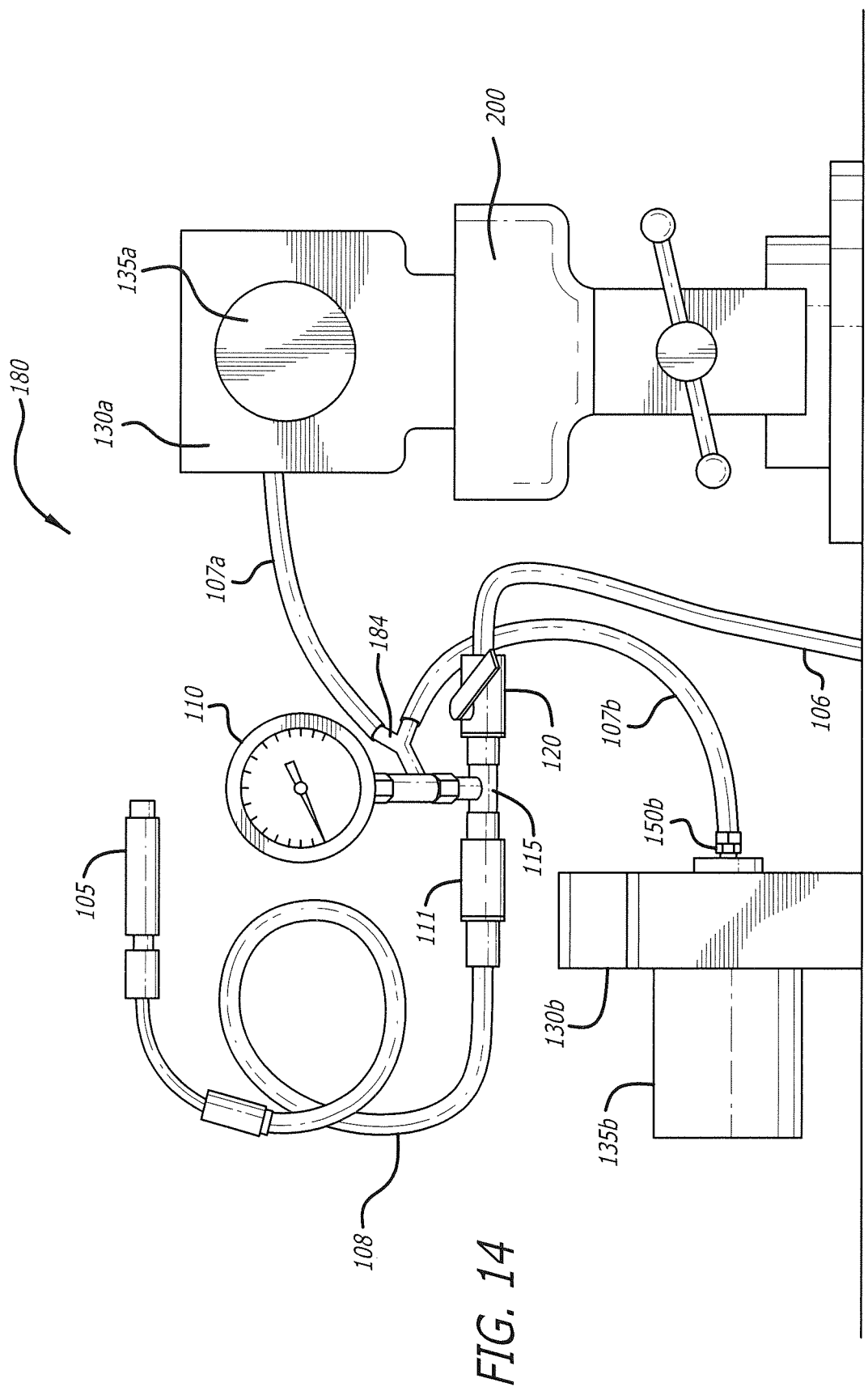
FIG. 14 is a side plan view of an exemplary embodiment of an oil filter-leak pressure-test station configured for simultaneously testing two oil filters.

FIG. 14 is a side plan view of an exemplary embodiment of an oil filter-leak pressure-test station 180 configured for simultaneously testing two oil filters 135a, 135b. It is contemplated that, in some embodiments, the oil filters 135a, 135b may be comprised of different makes and models of oil filter, provided the two oil filters have similar structural integrities. As shown, the oil filter-leak pressure-test station 180 is comprised an air pump 105, a pressure gauge 110, an interface fitting 115, a vent valve 120, and an overflow conduit 106. The oil filter-leak pressure-test station 180 is further comprised of a Y-connector 184 that bifurcates the conduit 107, shown in FIGS. 2-4, into a first conduit 107a and a second conduit 107b. It should be understood, however, that the Y-connector 184 may be comprised of a manifold dividing the conduit 107 into any number of conduits, as desired.

In the embodiment illustrated in FIG. 14, the first conduit 107a is connected to a first manifold 130a by a first quick-release attachment (not shown) so as to fluidly couple a first oil filter 135a with the interface fitting 115. Likewise, the second conduit 107b is connected to a second manifold 130b by a second quick-release attachment 150b so at to fluidly couple a second oil filter 135b with the interface fitting 115. Thus, the air pump 105 is configured to simultaneously modulate the internal pressure within both of the first and second oil filters 135a, 135b so as to demonstrate the existence or extent of any potential leaks. Further, the pressure gauge 110 is configured to display the internal pressure exerted on both of the first and second oil filters 135a, 135b. Moreover, it is envisioned that, in one embodiment the oil filter-leak pressure-test station 180, or a portion thereof, such as either or both of the manifolds 130a, 130b, may be advantageously retained between the jaws of a vise 200. It is contemplated that the vise 200 may serve as an aid in supporting and demonstrating the oil filter-leak pressure-test station 180, or a portion thereof, for the purpose of observation.

Figure 15:
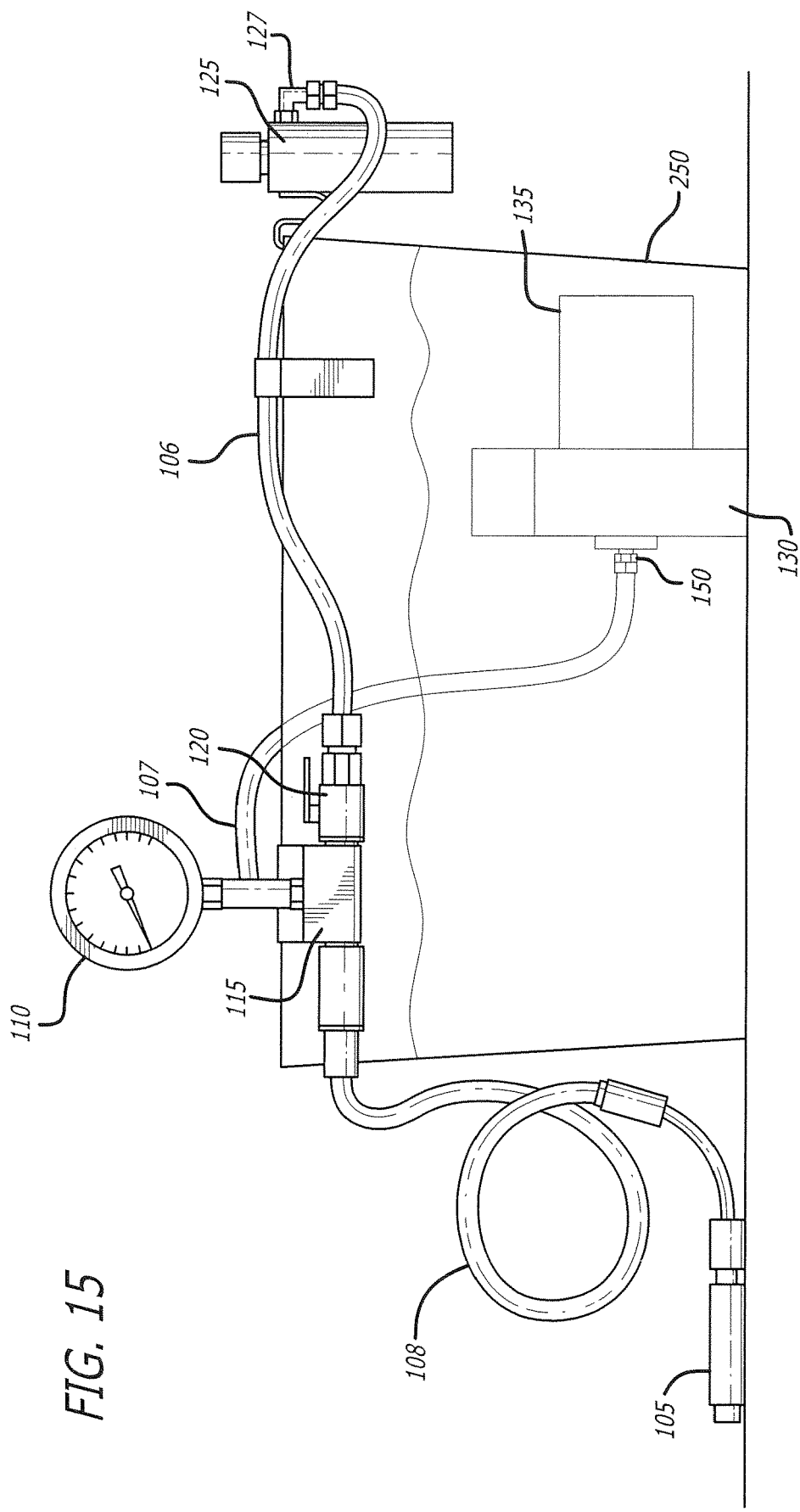
FIG. 15 is a side plan view of an exemplary embodiment of an oil filter-leak pressure-test station coupled with a submersion reservoir.

FIG. 15 is a side plan view of the oil filter-leak pressure-test station 100 coupled with a submersion reservoir 250. It is contemplated that the submersion reservoir 250 may be filled with water of any other liquid suitable for bringing attention to a location and/or an existence of any leaks within the oil filter 135. In one embodiment, a portion of the oil filter-leak pressure-test station 100, such as, for example, the manifold 130 and the oil filter 135, may be submerged in the submersion reservoir 250 filled with water, as shown in FIG. 15. Upon using the air pump 105 to establish a positive internal pressure within the oil filter 135, any leaks present in the oil filter will be directly observable by way of air bubbles within the submersion reservoir 250. In some embodiments, differential pressure or vacuum decay may be used with respect to the oil filter 135 prior to locating the leak by way of the submersion technique as discussed herein.

Regarding the method, in some embodiments the method comprises mounting an oil filter on an adapter of a manifold of an oil filter-leak pressure-test station providing a mounted oil filter; optionally placing the manifold with the mounted oil filter in a vise or submersion reservoir; pressurizing the oil filter-leak pressure-test station, thereby pressurizing the mounted oil filter; observing one or more leaks in the mounted oil filter; opening a valve vent of the oil filter-leak pressure-test station to vent air and reduce pressure in the oil filter-leak pressure-test station; and unmounting the mounted oil filter for repairing the one or more leaks in the oil filter or discarding the oil filter.

In some embodiments, mounting the oil filter on the adapter of the manifold of the oil filter-leak pressure-test station comprises mounting the oil filter on the adapter for the make and model of the oil filter, as the oil filter-leak pressure-test station can contain a plurality of different oil filter adapters for fluidly coupling different oil filter makes and models to the manifold of the oil filter-leak pressure-test station.

In some embodiments, pressurizing the oil filter-leak pressure-test station comprises pressurizing the mounted oil filter such that the internal pressure of the mounted oil filter is sufficient for observing the one or more leaks in the mounted oil filter without affecting the structural integrity of the mounted oil filter or bursting the mounted oil filter.

In some embodiments, observing the one or more leaks in the mounted oil filter comprises directly observing formation of 1) oil bubbles from the one or more leaks in the mounted oil filter or 2) water bubbles from the one or more leaks in the mounted oil filter while in the submersion reservoir. In some embodiments, observing the one or more leaks in the mounted oil filter comprises directly observing a hissing sound as air escapes the mounted oil filter through the one or more leaks in the mounted oil filter. In some embodiments, observing the one or more leaks in the mounted oil filter comprises indirectly observing the one or more leaks by depressurization of the oil filter-leak pressure-test station as determined by the pressure gauge.

In some embodiments, opening the valve vent of the oil filter-leak pressure-test station to vent air and reduce pressure in the oil filter-leak pressure-test station comprises passing air through a wire mesh of an overflow reservoir, which wire mesh gives oil vapor in the air a substrate upon which to condense. It should be understood that because the overflow reservoir is configured to condense the oil vapor, the overflow reservoir periodically needs to be emptied or drained in some embodiments of the method.

In some embodiments, unmounting the mounted oil filter comprises removing the mounted oil filter from the adapter for the make and model of the oil filter. If the oil filter is beyond repair, or if repair of the oil filter is not reasonable, the oil filter can be discarded.

In view of the foregoing, provided herein in some embodiments is an oil filter-leak pressure-test station, comprising a manifold configured to receive an oil filter; an air pump configured to modify an internal pressure of an oil filter; a pressure gauge configured to measure an internal pressure of an oil filter; a vent valve configured to isolate a flow of a working fluid, wherein working fluid upstream of the vent valve is prevented from reaching other components of the oil filter-leak pressure-test station downstream of the vent valve; and an interface fitting configured to fluidly couple the manifold, the air pump, the pressure gauge, and the vent valve. In some embodiments, the manifold is configured to be placed in a securing means for securing the manifold for determining by observation an existence or an extent of a leak in an oil filter. In some embodiments, the oil filter-leak pressure-test station further comprises at least one conduit per oil filter-leak pressure-test station component selected from the manifold, the air pump, the pressure gauge, and the vent valve, wherein the at least one conduit fluidly couples the oil filter-leak pressure-test station component to the interface fitting. In some embodiments, one or more of the conduits comprises a quick-release attachment configured for high pressure. In some embodiments, the oil filter-leak pressure-test station further comprises a plurality of adapters configured to fluidly couple any of a number of different oil filters to the manifold. In some embodiments, the oil filter-leak pressure-test station further comprises an overflow reservoir configured to collect oil mist condensate and prevent oil from reaching other components of the oil filter-leak pressure-test station downstream of the vent valve. In some embodiments, the manifold includes one or more engagement points configured to respectively receive one or more adapters for oil filters. In some embodiments, the interface fitting comprises a non-corrosive metal. In some embodiments, the vent valve is an isolation valve. In some embodiments, the manifold comprises an adapter configured to receive an oil filter.

Also provided herein in some embodiments is an apparatus, comprising a manifold, wherein the manifold is configured to accommodate a plurality of different oil filter adapters for fluidly coupling different oil filter makes and models to the manifold; an air pump configured to modify an internal pressure of an oil filter; a pressure gauge configured to measure an internal pressure of an oil filter; and an interface fitting, wherein the interface fitting is configured to fluidly couple the manifold, the air pump, and the pressure gauge through a plurality of interface fitting-bound conduits including at least one conduit from each of the manifold, the air pump, and the pressure gauge. In some embodiments, one or more conduits of the plurality of conduits comprises quick-disconnect-type fittings for quickly connecting to or disconnecting from the interface fitting. In some embodiments, the quick-disconnect-type fittings comprise pneumatic connectors, and the interface fitting respectively comprises one or more pneumatic couplers. In some embodiments, the manifold is configured to be placed in a securing means for securing the manifold for determining by observation an existence or an extent of a leak in an oil filter. In some embodiments, the securing means is a vise or a submersion reservoir. In some embodiments, the apparatus further comprises a vent valve fluidly connected to the interface fitting, wherein the vent valve is configured to open to vent air and reduce pressure in the apparatus subsequent to an oil filter-leak pressure test. In some embodiments, the apparatus further comprises an overflow reservoir fluidly connected to the interface fitting through an intermediate vent valve, wherein the overflow reservoir is configured to collect oil mist condensate on a wire mesh when the vent valve is opened to vent air and reduce pressure in the apparatus.

Also provided herein in some embodiments is an apparatus, comprising one or more manifolds, wherein the one or more manifolds are each configured to accommodate a plurality of different oil filter adapters for fluidly coupling different oil filter makes and models to the one or more manifolds; an air pump configured to modify an internal pressure of an oil filter; a pressure gauge configured to measure an internal pressure of one or more oil filters; and an interface fitting, wherein the interface fitting is configured to fluidly couple the one or more manifolds, the air pump, and the pressure gauge through a plurality of interface fitting-bound conduits including at least one conduit from each of the one or more manifolds, the air pump, and the pressure gauge.

In some embodiments, the apparatus further comprises a vent valve fluidly connected to the interface fitting, wherein the vent valve is configured to open to vent air and reduce pressure in the apparatus subsequent to an oil filter-leak pressure test; and an overflow reservoir fluidly connected to the vent valve, wherein the overflow reservoir is configured to collect oil mist condensate on a wire mesh when the vent valve is opened to vent air and reduce pressure in the apparatus. In some embodiments, the apparatus comprises at least two manifolds for simultaneously testing at least two oil filters.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. An apparatus, comprising:
    a manifold component configured to accommodate a plurality of different oil filters;
    an air pump component configured to modify an internal pressure of an oil filter;
    a pressure measuring component;
    an interface fitting, wherein the interface fitting is configured to couple each component to the interface via at least one fitting-bound conduit.

2. The apparatus of claim 1, further comprising:
    a vent valve fluidly connected to the interface fitting, wherein the vent valve is configured to open to vent air and reduce pressure in the apparatus subsequent to an oil filter-leak pressure test.

3. The apparatus of claim 1, further comprising:
    an overflow reservoir fluidly connected to the interface fitting through an intermediate vent valve, wherein the overflow reservoir is configured to collect oil mist condensate on a wire mesh when the vent valve is opened to vent air and reduce pressure in the apparatus.

4. The apparatus of claim 1, wherein one or more fitting-bound conduits comprises quick-disconnect-type fittings for quickly connecting to or disconnecting from the interface fitting.

5. The apparatus of claim 4, wherein the quick-disconnect-type fittings comprise pneumatic connectors, and wherein the interface fitting respectively comprises one or more pneumatic couplers.

6. The apparatus of claim 1, wherein the manifold is configured to be placed in a securing means for securing the manifold for determining by observation an existence or an extent of a leak in an oil filter.

7. The apparatus of claim 6, wherein the securing means is a vise or a submersion reservoir.

8. An apparatus, comprising:
    at least one manifold configured to accommodate different oil filter makes and models to the at least one manifold;
    an air pump;
    a means for measuring an internal pressure of an oil filter; and
    an interface fitting, wherein the interface fitting is configured to include at least one interface fitting-bound conduit from each of the at least one manifold, the air pump, and means for measuring internal pressure.

9. The apparatus of claim 8, further comprising:
    a vent valve fluidly connected to the interface fitting, wherein the vent valve is configured to vent air and reduce pressure in the apparatus subsequent to an oil filter-leak pressure test; and
    an overflow reservoir fluidly connected to the vent valve, wherein the overflow reservoir is configured to collect oil mist condensate on a wire mesh when the vent valve is opened to vent air and reduce pressure in the apparatus.

10. The apparatus of claim 9, wherein the apparatus comprises at least two manifolds for simultaneously testing at least two oil filters.

* * * * *